United States Patent [19]

Hall et al.

[11] 4,203,346

[45] May 20, 1980

[54] BLIND BOLT FASTENER FOR LOW BEARING STRENGTH MATERIALS

[75] Inventors: David E. Hall, Costa Mesa; Edgar L. Stencel, Huntington Beach, both of Calif.

[73] Assignee: VSI Corporation, Pasadena, Calif.

[21] Appl. No.: 867,008

[22] Filed: Jan. 5, 1978

Related U.S. Application Data

[63] Continuation of Ser. No. 806,302, Jun. 13, 1977, abandoned, which is a continuation-in-part of Ser. No. 730,738, Oct. 8, 1976, abandoned.

[51] Int. Cl.² .................... F16B 13/06; F16B 13/10
[52] U.S. Cl. ........................................ 85/70; 85/72
[58] Field of Search ............... 85/70, 71, 72, 73, 74, 85/75, 77, 78

[56] References Cited

U.S. PATENT DOCUMENTS

| 2,030,167 | 2/1936 | Miller | 85/70 |
|---|---|---|---|
| 2,562,019 | 7/1951 | Collet | 85/70 |
| 2,887,003 | 5/1959 | Brilmeyer | 85/72 |
| 3,236,143 | 2/1966 | Wing | 85/70 |
| 3,262,353 | 7/1966 | Waeltz et al. | 85/72 |
| 3,277,771 | 10/1966 | Reynolds | 85/70 |
| 3,369,442 | 2/1968 | Darby et al. | 85/70 |
| 3,443,474 | 5/1969 | Blakeley et al. | 85/74 |
| 3,461,771 | 8/1969 | Briles | 85/70 |
| 4,007,659 | 2/1977 | Stencel | 85/70 |
| 4,033,222 | 7/1977 | Wilson | 85/73 X |
| 4,089,247 | 5/1978 | Dahl et al. | 85/70 |

FOREIGN PATENT DOCUMENTS

| 958326 | 9/1949 | France | 85/74 |
|---|---|---|---|
| 1413592 | 11/1975 | United Kingdom | 85/70 |

Primary Examiner—Thomas J. Holko
Attorney, Agent, or Firm—Christie, Parker & Hale

[57] ABSTRACT

A blind fastener has a nut with a threaded bore, a core bolt having external threads for receipt by the nut, and a sleeve for expansion by the head of the core bolt and a shoulder of the nut to form a blind side folded bulb against the backside sheet of a joint. A thin-walled, tapered section of the sleeve fits over a relieved section of the nut and bears against the shoulder of the nut. The taper is such that the thin wall increases in thickness away from the shoulder. An axially adjacent thick-walled section of the sleeve bears on the core bolt head and resists sleeve tuck-out over the core bolt head, concentrically aligns the sleeve on the core bolt, and assures that the thin-walled section of the sleeve is the section that bulbs. During setting, the sleeve expands by compression exerted on it by the core bolt head and the shoulder. The thin wall section folds against the backside sheet with an ever-increasing area as tightening continues. The fold always develops against the backside sheet because the portion of the sleeve free of the sheet is weakest in compression there. Axial clamp-up force is spread over a large area of the sheet but unit loading is low.

14 Claims, 3 Drawing Figures

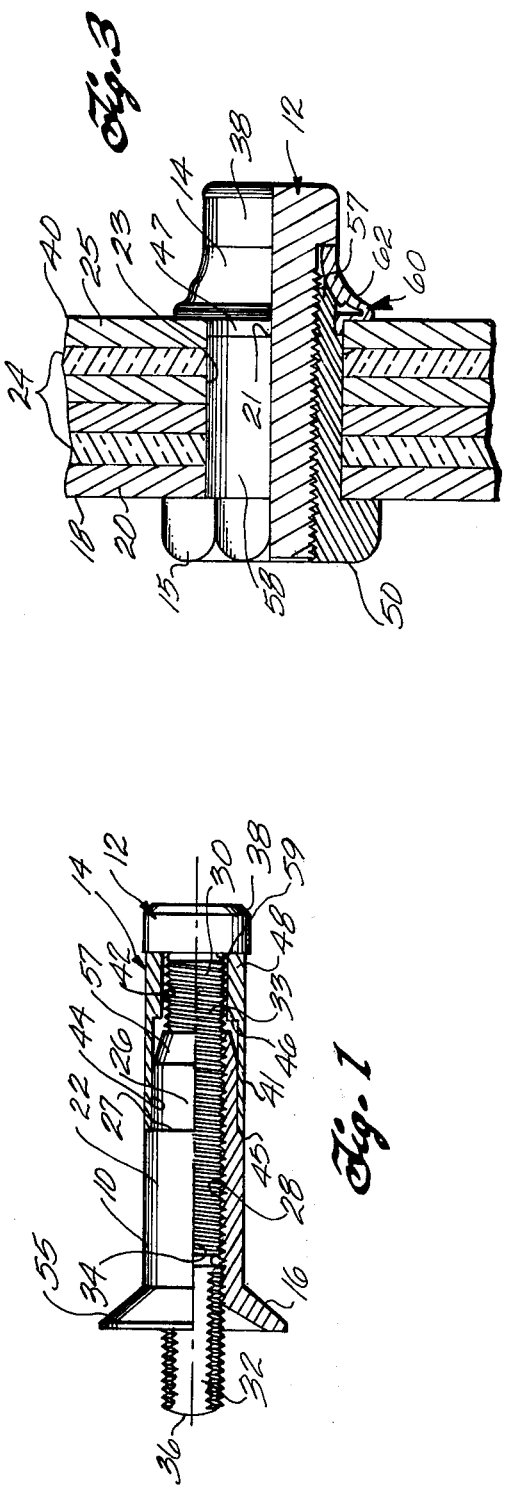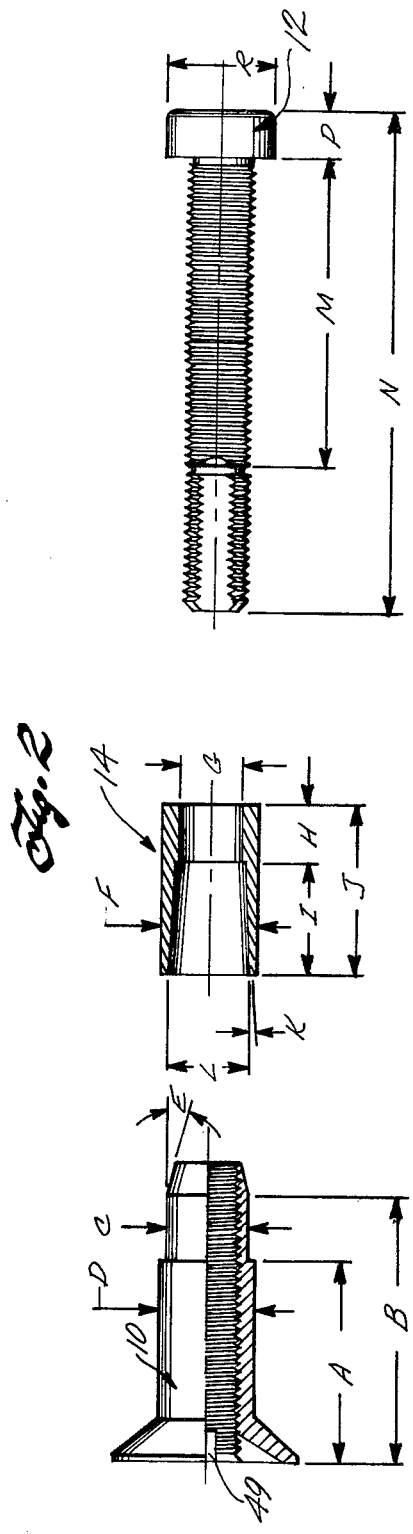

BLIND BOLT FASTENER FOR LOW BEARING STRENGTH MATERIALS

CROSS REFERENCE TO RELATED APPLICATION

This is a continuation of application Ser. No. 806,302, filed June 13, 1977, which in turn was a continuation-in-part of application Ser. No. 730,738, filed Oct. 8, 1976, both now abandoned.

BACKGROUND OF THE INVENTION

The present invention relates to blind fasteners in general and more in particular to a blind fastener having an expandable sleeve for bearing on the backside of a joint and applying a controlled low unit load on the backside.

Blind fasteners fasten two or more sheets together from a single side. The fastener is inserted from a setting side of the sheets into aligned holes in the sheets. An element of the fastener on the blind or inaccessible side of the sheets is expanded and brought into bearing against the blind side. A head on the setting side coacts with the expanded element to clamp up the sheets by applying a compressive load on them.

One form of blind fastener has a hole filling sleeve that has a manufactured head and a nose for extending from the backside sheet. An expandable portion of the sleeve is a portion of the nose. A pin drawn axially by a large force compressively fails the expandable portion and bulbs it by reacting it against the backside sheet. The expandable portion can be made to separate from the sleeve proper by providing a fracture zone between them. Further, the expandable portion can be externally tapered so that the thinnest cross section is against the backside sheet at the outset of bulbing. The pin has a breakneck that fails upon reaching a predetermined load during setting and at failure of the breakneck the fastener is set. One such fastener is described in U.S. Pat. No. 3,277,771 to Reynolds. A problem with this fastener is that it is possible to form a bulb out of contact with the backside sheet without being aware of it. Furthermore, as compared with a threaded fastener, the setting load is high because the mechanical advantage of the threads is not present.

The external taper of the sleeve in Reynolds, also, does not develop the external diameter and bearing area of an externally cylindrical sleeve because the diameter is necessarily less at the critical zone of failure next to the backside sheet. This type of problem was recognized in U.S. Pat. No. 3,253,495 to Orloff who proposes to band anneal an expandable section of a hole filling sleeve so that there is a strength gradient with strength increasing away from the backside sheet and head of the sleeve. This promotes bulbing at the backside sheet. Orloff also suggests that a weak zone can be presented to the backside sheet by varying the cross-sectional area of the sleeve to get a strength gradient. U.S. Pat. No. 2,562,019 to Colley shows a rivet set with a mandrel and having an internally tapered bore with a shank thickness progressively greater away from the work to promote bulbing on the backside of the sheet. Among other things, the Colley construction is not, however, otherwise sensitive to setting load and runs the taper into the zone within a sheet, which reduces shear strength.

Another type of blind fastener has a nut for receiving a setting screw or core bolt and a separate sleeve as the expandable element. The sleeve is expanded on the blind side of the joint by tightening the core bolt and nut. The nut has a manufactured head for bearing on the setting side of a joint. This head may have wrenching flats for purchase of a wrenching tool and prevention of nut rotation during setting. The manufactured head may be protruding or flush. The nut has a shank with a diameter for substantially complete occupancy of the aligned holes in the sheets. A blind side end of the nut, the end opposite the manufactured head, is a nose which externally tapers to provide an expansion "ramp" surface over which the sleeve expands. The sleeve is cylindrical and has an external diameter no greater than the diameter of the nut so that the sleeve passes through the aligned holes in the sheets and an internal diameter for receipt of the core bolt. A core bolt head has a diameter no greater than the diameter of the sleeve for passage to the blind side and a radial shoulder for bearing on the end of the sleeve. The core bolt has means on the setting side to tighten it in the female threads of the nut, which means may be opposed wrenching flats. As the core bolt is threaded relative to the nut, the screw head bears on the sleeve and the sleeve is forced over the nose of the nut and expanded against the blind side of a joint. Load determining means such as a breakneck in the screw can fail to stop tightening and determine the amount of clamp-up force. This type of fastener is described in U.S. Pat. No. 3,596,948 to Thomas F. Spoehr and U.S. Pat. No. 3,443,474 to Blakeley and Bergere.

The clamp-up force applied to the joint axially of the fastener between the expanded sleeve and the manufactured head of the nut distributes to the blind side of the joint through the area of the joint-sleeve bearing. With frangible materials such as graphite-epoxy composite structures, the unit loading applied by this type of fastener can fail the material in compression.

A third type of blind fastener has a threadless sleeve in place of the nut of the fastener just described. The sleeve has a manufactured head for bearing on the setting side of a joint. A threaded nut has a thin-walled section that collapses against the backside sheet with setting. The thin-walled section bears on a shoulder of the nut. A threaded mandrel engages the threads of the nut portion and draws the nut axially without turning in the nut portion threads. After setting, the setting mandrel is withdrawn and a core bolt installed to complete a joint. This type of fastener is described in U.S. Pat. No. 3,369,442 to Darby et al.

The type of fastener just described can have a tendency to "bulb in the air." The blind side bulb formed upon pulling on a setting mandrel forms but does not always bear against the backside sheet. A condition where this can occur is when the nut portion is loaded eccentrically with respect to the longitudinal axis of the sleeve. Also, setting requires the removal of the setting mandrel and installation of the core bolt, a step not required in the first fastener described.

Accordingly, there is a need for a blind fastener that applies a low unit load to the backside sheet of a joint, that does not fail that sheet, that provides adequate clamp-up force on the joint, that reliably forms a backside bulb which clamps up the sheets, and that forms a joint without a setting mandrel.

SUMMARY OF THE INVENTION

The present invention provides a blind fastener characterized by an expandable sleeve that upon expansion has a large bearing area for transfer of load from the sleeve to a backside sheet surface of a joint formed of at least two sheets and the fastener. The sleeve bulbs in response to compressive loading of the sleeve between a shoulder of a nut and a head of a screw of the fastener. The compressive loading is by tightening the threads of the screw in threads of the nut.

The large bearing area of the bulb avoids exceeding a predetermined unit load on the sheet. Forming the bulb by compression between the nut shoulder and screw head by tightening the screw avoids applying a high unit load on the sheet which would occur if the sheet reacted all the compression load. The bulb forms against the backside sheet progressively and in a controlled way with greater and greater bearing area between the bulb and the sheet as the total clamp-up load increases. Assurance of bulb formation at and on the backside of the blind side sheet results from an internal taper of the sleeve bore. The taper converges away in that direction from the work so that the wall thickness of the sleeve increases.

A specific embodiment of the present invention contemplates a nut having female threads for receipt of a male threaded core bolt. The core bolt in turn has a head for bearing on an expandable sleeve on the blind side of at least two sheets. The sleeve is received on the core bolt between the core bolt head and a shoulder of the nut. The shoulder is spaced from a nose end of the nut by a relieved section. The sleeve has a right cylindrical outside surface. The sleeve also has a thin-walled section axially longer than the relieved section. A portion of the thin-walled section is received on the relieved section and a portion extends beyond the end of the nose of the nut for the formation of a blind side bulb. The thin wall section is tapered internally with the taper converging away from the sheets, the wall thickness of the thin-walled section becoming greater the greater the distance away from the sheets (and the manufactured head of the nut). The thin-walled section is backed axially at the end of the sleeve remote from the sheets by a thick-walled section of the sleeve. This thick-walled section has an inside diameter that receives with a close fit the shank of the core bolt to thereby align the axes of the sleeve and screw. The thick-walled section of the sleeve prevents tuck-out of the sleeve over the head of the screw and determines the zone of bulb formation to be in the thin-walled section. The nut has a manufactured head for bearing on a setting side of the sheets. In different words, the sleeve has an axial section, which is thin compared with an adjoining second axial section, which is thick. The thickness of the first section is controlled so that the sleeve will bulb or fold upon being loaded axially in a manner to present a large bearing area to a backside sheet after a good-sized bulb has formed. The presentation of a large bulb of the sleeve to the sheet keeps unit loading on the sheet below the failure load of the sheet material. The required clamp-up load on the sheets along the axis of the fastener can still be met. The presentation of a largely bulbed sleeve to the backside sheet avoids excessive unit loading.

Tapering the sleeve assures initiation of bulbing on the exposed surface of the backside sheet. The internal taper assures the largest possible bulb for a sleeve having a fixed outside diameter, a constraint on all blind fasteners using a sleeve. It has been found that with the taper of the sleeve as described below very satisfactory results are produced. With an included angle of the taper of about 2°, the ratio of the largest internal diameter of the cone to the outside diameter of the cone should be about 0.928, and the ratio of the length of the tapered bore to the outside diameter should be about 1.157. The material of the sleeve for these values is preferably 304 stainless steel.

The core bolt has wrenching flats so that it can be threaded into the nut to develop the axial load on the sleeve for the sleeve's bulbing and subsequent loading against the backside sheet. The external surfaces of the nut shank, sleeve and core bolt head may typically be right cylindrical and about the same diameter, except where the nut shank is relieved. The core bolt may have a breakneck portion so that a setting end of the screw separates from the balance of the screw at a predetermined load corresponding to a predetermined clamp-up force.

Preferably, the strength of the thin-walled section of the sleeve is such that it does not double completely together within the design load of the fastener with the sides of the doublet touching at the radius of the thick-walled section of the sleeve that is axially adjacent the tapered section. This precaution prevents excessive loading of the adjacent sheet in the annular band congruent with the thick-walled section. In other words, the thick-walled section of the sleeve is prevented from acting on the blind side sheet, except through the large area developed by the collapsed sleeve and in contact with the sheet, by terminating increasing axial load before sides of the fold in the sleeve touch one another. If a zone subtended by the thick-walled section acted on the sheet, there would be a risk of exceeding the sheet's compressive stress strength.

These and other features, aspects and advantages of the present invention will become more apparent from the following description, appended claims and drawings.

BRIEF DESCRIPTION OF THE FIGURES

FIG. 1 is an elevational assembly view of the fastener of the present invention, partly in half section;

FIG. 2 is an elevational, exploded view of the fastener of the present invention to identify certain dimensional relationships; and FIG. 3 is a side view partly in half section of the fastener of the present invention set in a pair of sheets.

DESCRIPTION OF THE PREFERRED EMBODIMENT

With reference to FIG. 1, the fastener of this invention includes as major components a nut 10, a screw or core bolt 12, and a sleeve 14. As is standard in this type of blind fastener, the nut has a manufactured head 16 for bearing on a setting side of a joint, such as a side 18 of a sheet 20 of FIG. 3. The nut also has a shank 22 of a diameter to fit into aligned holes such as holes 23 in sheet 20, intermediate sheets 24, and a backside or blind side sheet 25 of FIG. 3. The blind end of the nut has a nose 26 with a right cylindrical surface of a diameter smaller than the shank diameter and junctioning with the shank at a radial shoulder 27. The interior of the nut is defined by an axial bore 28 threaded throughout its length.

Screw or core bolt 12 has male threads 30 for complementary receipt in the threads of the nut. The core bolt has a tail 32 separated from a permanent part 33 of the core bolt at breakneck groove 34. The tail has wrenching means in the form of opposed parallel flats 36. As seen in FIG. 1, the tail extends axially of the manufactured head of the nut for driving by a wrenching tool.

Core bolt 12 has a head 38 at the end thereof opposite tail 32. This head bears axially on sleeve 14.

Sleeve 14 interposes between head 38 of core bolt 12 and shoulder 27 of nut 10. During setting, sleeve 14 is axially compressed by screw head 38 and shoulder 27. The compression bulbs the sleeve radially outward against a back surface 40 of backside sheet 25. Head 38 of the core bolt pushes the bulb of the sleeve tightly against the sheet. The bulb is forming as axial clamp-up load is applied to the backside sheet. The area of the sleeve bulb on the backside surface is large when the backside sheet is fully loaded. Bulbing at the sheet occurs because the sleeve always has its thinnest unrestrained wall there.

The sleeve of the present invention has a constant outer diameter surface 41 and a clear-through axial bore 42 from end-to-end. The bore has a diameter to accept the major thread diameter of core bolt 12. A thin-walled section 44 of the sleeve has a larger interior bore diameter than the balance of the sleeve and is tapered from an end 45 of the sleeve to an interior shoulder a step 46 of the sleeve. End 45 abuts against shoulder 27 of nut 10. The taper converges away from this shoulder and towards head 38 of core bolt 12. In application, the taper converges towards the axis of the fastener and away from the sheets being fastened. As will be developed subsequently, the taper is slight, about 2°. As will also become apparent, shoulder 27 of the nut is within the sheets with the grip range of the fastener. This means that the proximate end of the sleeve will also be within the sheets. That portion of the sleeve within the sheets is restrained by the sheets and cannot bulb. FIG. 3 shows a restrained end 47 of the sleeve shown there. A thick wall section 48 axially backs up the thin-walled section. One end of the thick-walled section is shoulder 46, the other end is the extreme outer end of the sleeve and bears against head 38 of core bolt 12. The thin-walled section has a cross-sectional area for resisting axial column loading that is considerably smaller than the cross-sectional area of the thick-walled section that resists such loading. The thin-walled section fails in hoop upon sufficient axial loading. The thick-walled section maintains its original shape with this loading because of its thickness. The thick-walled section also keeps the sleeve and the core bolt concentric and avoids sleeve tuck-out over head 38 of the screw. Bulbing takes palce gradually against the backside of the sheet because axial loading occurs gradually and much of the early load is initially taken up by the nut at shoulder 27. As the area of the bulb on the backside sheet increases, more and more total load goes into the sheets. However, the unit load on the sheets always is low. In other words, the sheets will not fail because of the large bearing area.

The sleeve bulbs in a controlled manner. It has been found that the taper of the bore of the sleeve reliably forms a bulb at the backside surface of a sheet. If the taper is too much, the cross section of the wall of the sleeve increases too fast. This results in bulbs that are too small in diameter and excessive unit loading on the sheets. With not enough taper, bulb formation away from the sheets without the ability of the core bolt head to proximate the bulb to the sheets could occur. Also, insufficient taper can result in radially inward collapse of the thin-walled section. The most important variables of the thin-walled section of the sleeve that affect bulbing performance are: the angle of the taper, the length of the tapered section, and the thickness of the tapered section. Since the sleeve is right cylindrical on its outside, thickness can be related to internal diameter and taper angle. The table below relates these and other dimensional relationships in a 3/16 inch outside diameter fastener and normalized by ratioing the variable and the outside diameter. The tolerances given are production tolerances. It is thought that satisfactory bulbing will occur within design variations of plus or minus 10% of the important variables. FIG. 2 shows the dimensions called out in the table.

| Part | Dimension with Characteristic Diameter (D) of 3/16 inch | Part Dimension Divided by Characteristic Diameter |
| --- | --- | --- |
| Sleeve (Material: 304 stainless steel) | | |
| Outside diameter (F) | 0.197 $\begin{array}{l}+ 0.001 \\ - 0.000\end{array}$ | 1.051 |
| Length (J) | 0.320 $\begin{array}{l}+ 0.000 \\ - 0.005\end{array}$ | |
| Cylindrical bore length (H) | 0.103 $\begin{array}{l}+ 0.010 \\ - 0.000\end{array}$ | 0.549 |
| Length of cone (I) | 0.217 $\begin{array}{l}+ 0.010 \\ - 0.005\end{array}$ | 1.157 |
| Largest diameter of cone (L) | 0.174 $\begin{array}{l}+ 0.002 \\ - 0.000\end{array}$ | 0.928 |
| 1/2 Included angle of cone (K) | 2° $\begin{array}{l}+ 0° \\ - 0°15'\end{array}$ | — |
| Cylindrical bore diameter (G) | 0.137 $\begin{array}{l}+ 0.002 \\ - 0.000\end{array}$ | 0.731 |
| Nut (Material: 6A1-4V Titanium Alloy) | | |
| Outside shank diameter (D) | 0.1970 ± 0.0005 | 1.051 |
| Relief diameter (C) | 0.165 ± 0.0005 | 0.880 |
| Length to chamfer (B) | 0.282 ± 0.005 | — |
| Length to shoulder (A) | 0.180 ± 0.005 | — |
| 1/2 Included angle of chamfer (E) | 20° ± 1° | — |
| Core Bolt (Material: In cone 1 #718 Hi-Temp stainless steel) | | |
| Overall length (N) | 1.050 ± 0.020 | — |
| Head length (P) | 0.096 $\begin{array}{l}+ 0.006 \\ - 0.000\end{array}$ | — |
| Head diameter (R) | 0.194 ± 0.000 | — |
| Length from head to breakneck (M) | 0.450 ± 0.010 | — |

In greater detail, manufactured head 16 of nut 10 is shown in FIGS. 1 and 2 as being a standard recessed head with internal wrenching means. This type of head is for flush mounting, the wrenching means are internal, 90° spaced apart slots 49 (see FIG. 1). Alternatively, the head can be protruding with external wrenching means as shown in FIG. 3 at 50. In either case, a surface or shoulder, such as shoulder 55 in FIG. 1, provides bearing against the setting side 18 of sheet 20. The area for such bearing is large enough so that the unit loading will not exceed the compression strength of the sheet material.

Shank 22 of nut 10 extends axially from head 16 through the hole in the sheets to be fastened by the fastener. Shoulder 27 is axially spaced from head 16 a distance limited by the requirement that the shoulder be within the sheets at minimum grip. This condition assures that the bulb of the sleeve will tightly bear against the backside sheet. It also provides a band of material of the sleeve in tight, radial compression with the material of the sheets so as to prevent rotation of the sleeve with respect to the sheets. In the illustrated embodiment, the shank is right cylindrical. Shoulder 27 defines an annular abutment surface for sleeve 14 within the sheets being fastened. During the initial stages of setting, the compressive load on the sleeve reacts completely through the shoulder.

Nose 26 extends axially from shoulder 27 to the end of the nut opposite manufactured head 16. The nose is right cylindrical for an axial distance beginning at shoulder 27 and ending at a chamfer 57, and has a diameter to receive the sleeve, as can be seen in FIG. 1. The length of nose 26 is short enough so that its tip does not engage head 38 of the core bolt after the development of the largest design blind side bulb on the sleeve, which occurs at minimum grip. Chamfer 57 at the leading end of the nose permits the nose to easily enter the sleeve.

The nut of FIG. 3 is the same as the nut of FIGS. 1 and 2 except for the differences in a protruding head and a flush head nut and the differences attendant with these features. The core bolt of FIG. 3 has a shank 58 which is longer than shank 22 of core bolt 12 to accommodate the same grip range. The noses of the two core bolts are the same.

Screw or core bolt 12 is shown threaded throughout its length. The threads engage threads 28 of the nut. The core bolt has tail section 32 and permanent section 33. As the core bolt becomes tighter and tighter in the nut because of the load the sheets put on it during the setting of the fastener, the stress in breakneck groove 34 will increase to the ultimate strength of the core bolt at that point. The tail will separate from the balance of the core bolt with the resulting failure and can be discarded. This is a known means for controlling the amount of clamp-up force applied to a joint.

Head 38 of core bolt 12 has a shoulder 59 for axial bearing against thick-walled section 48 of the sleeve and the transmission of axial, compressive clamp-up force to the sleeve.

The sleeve external diameter, core bolt head external diameter, and nut shank external diameter are small enough to be inserted through aligned holes in the sheets. The actual external configuration of the shank, sleeve and core bolt head can take different forms from the right cylindrical forms illustrated in FIG. 1.

The inside diameter of tapered, thin-walled section 44 of sleeve 14 is larger than the diameter of nose 26 of nut 10 so that the sleeve is received over the nose. The outside diameter of the sleeve is no greater than that of the shank of the nut so that the sleeve is received in the backside sheet without special hole preparation. The thickness of the thin-walled section is related to the desired clamp-up load of the fastener on the sheets in that a bulb will form and draw up against the backside sheet before separation of the core bolt at the breakneck. The thick-walled section of the sleeve, as already mentioned, centers the sleeve on the core bolt, prevents tuck-out of the sleeve over the head of the core bolt, and limits the axial location of the bulb to the thin-walled section.

The fastener of this invention finds particular utility with sheets of low compressive bearing strength. With reference to FIG. 3, sheets 20, 24 and 25 are in a structure of, say, graphite-epoxy composite. This material has low compressive bearing strength. The formation of a large bulb progressively with increase clamp-up on the material of the sheets reduces the unit loads on the sheets over that which would be experienced with a small bulb. Furthermore, setting the fastener in part on itself by reacting the load on sleeve 14 in part on shoulder 27 gives the fastener time to develop a large bulb before large clamp-up forces are experienced.

FIG. 3 illustrates the fastener as set. It is useful in describing the setting of the fastener. Head 38 and shoulder 27 compressively bear on sleeve 14 as bolt 12 tightens in the nut. The sleeve fails and bulbs out where it is weakest. The sleeve is weakest at the back surface of the blind side sheet because at this location the sleeve is unsupported radially by the sheets and the sleeve has its thinnest wall section unsupported radially by the sheets. Bulb 60 forms in the thin-walled tapered section. Further tightening of the screw and the nut will increase the diameter of bulb 60 and increase the loading of the sheets by the bulb. With more and more tightening, the bulb-sheet interface sees more and more of the load, and shoulder 27 and the sleeve interface see proportionately less and less. Finally, a fully developed bulb is formed when breakneck 34 fails. In the fully set fastener the thin-walled section of the sleeve is folded upon itself at 62 with a substantial area of the sleeve fold bearing against the backside sheet. The fold walls preferably will not touch at design clamp-up load so that the unit loading of the backside sheet engaged by the bulb is uniform and not concentrated in a radial zone near the nut. With loading beyond that necessary to fold the walls together, the loading tends to concentrate in an annular zone congruent with the unbulbed portion of the sleeve. This is undesirable because it unduly increases unit loading. The thick-walled section of the sleeve and shoulder 46 can ride up chamfer 57 and the chamfer directs this slight expansion of the thick-walled section.

The fastener can develop a larger bulb at minimum grip than at maximum grip. At minimum grip the total sheet thickness is small and there is more space on the blind side for the bulb to form and be drawn against the sheets. At maximum grip, total sheet thickness is large and there is less space on the blind side for the bulb to form and be drawn against the sheets. For maximum grip, the bulb may not completely form before the sheets are engaged.

Thus, the present invention provides a blind fastener which has a sleeve which effects loading of a backside sheet so that the sheet experiences only modest unit loads. As a consequence, the fastener will not fail the sheet even when the sheets are made of a material weak in compression, such as graphite-epoxy composite structures. The bulb reliably forms so that it will bear on the backside sheet and connot form away from the sheet because of the taper in the thin-walled section of the sleeve. Tapering the inside of the sleeve permits the formation of a large bulb because full advantage is taken of the maximum possible starting diameter. The breakneck prevents overloading.

The present invention has been described with reference to a certain preferred embodiment. The spirit and scope of the appended claims should not, however, necessarily be limited to the foregoing description.

What is claimed is:

1. An improvement in a blind fastener of the type having a nut with a manufactured head to abut a setting side of a pair of sheets, a shank of the nut integral with and axially adjacent the manufactured head, the shank being for receipt in aligned holes in the sheets, an internally threaded bore of the nut, and a nose of the nut integral with the shank and on an end of the nut opposite the manufactured head, a sleeve for developing a blind side bulb against a backside of the sheets and to cooperate with the manufactured head in holding the sheets together, the sleeve having an axial bore and a limited outside diameter for passing through the aligned holes, a threaded core bolt for receipt in the bore of the sleeve and having a head for compressive engagement with an end of the sleeve opposite the nose of the nut, the core bolt head having a diameter for passing through the aligned holes, the improvement comprising:

(a) a relieved section of the nose of the nut extending axially from the nose end of the nut to a radial shoulder at an interior end of the relieved section, the relieved section having a diameter less than the diameter of the shank;

(b) a thin-walled and tapered section of the sleeve having an internal diameter for receipt on the relieved section of the nut, an outside diameter that is substantially constant and equal to the diameter of the shank, a free end for compressive bearing on the shoulder at the interior end of the relieved section, the taper being an internal taper and converging in a direction away from the free end of the thin-walled section so that the wall thickness of the thin-walled section is always thinner at the backside of the sheets than anywhere else in the thin-walled section in a direction away from the sheets, a maximum outside diameter substantially equal to the diameter of the shank, and an axial length greater than the axial length of the relieved section of the nut;

(c) a thick-walled section of the sleeve axially adjacent the thin-walled section, the thick-walled section having an internal diameter less than the internal diameter of the thin-walled section, and an outside diameter substantially equal to the outside diameter of the thin-walled section, the thick-walled section having the end of the sleeve which compressively bears with the head of the core bolt; and (d) the thin-walled section being capable of receipt in the hole in the backside sheet and in extending from such sheet, and of collapsing to form a bulb at the backside sheet in response to being compressed between the head of the core bolt and the shoulder of the nut upon the tightening of the core bolt in the nut to draw the head of the core bolt towards the shoulder of the nut.

2. The improvement claimed in claim 1 wherein the thin-walled section has an axial length and thickness such that the thin-walled section's state of collapse at maximum design axial load on the sleeve has the sides of a fold resulting from the collapse out of contact with one another radially adjacent the nose of the nut and axially adjacent the thick-walled section of the sleeve.

3. The improvement claimed in claim 2 wherein the core bolt includes a breakneck for failure at a predetermined axial load, the breakneck separating a tail section of the core bolt from the balance of the core bolt, the tail section having wrenching means for tightening the core bolt in the nut, which means become inoperative upon failure of the breakneck.

4. The improvement claimed in claim 3 wherein the nose of the nut has a conical chamfer.

5. The improvement claimed in claim 4 wherein a shoulder connects the thin-walled and thick-walled sections.

6. The improvement claimed in claim 1 wherein the included angle of the taper is about 2°, the ratio of the largest diameter of the taper to the diameter of the fastener is about 0.928, and the ratio of the length of the tapered section to the diameter of the fastener is about 1.157, with the above three values being within plus or minus ten percent.

7. The improvement claimed in claim 6 wherein the thin-walled section has an axial length and thickness such that the thin-walled section's state of collapse at maximum design axial load on the sleeve has the sides of a fold resulting from the collapse out of contact with one another radially adjacent the nose of the nut and axially adjacent the thick-walled section of the sleeve.

8. The improvement claimed in claim 7 wherein the core bolt includes a breakneck for failure at a predetermined axial load, the breakneck separating a tail section of the core bolt from the balance of the core bolt, the tail section having wrenching means for tightening the core bolt in the nut, which means becomes inoperative upon failure of the breakneck.

9. An improvement in a blind fastener of the type having a nut with a manufactured head to abut a setting side of a pair of sheets, a shank of the nut integral with and axially adjacent the manufactured head, the shank being for receipt in aligned holes in the sheets, an internally threaded bore of the nut, and a nose of the nut integral with the shank and on the end of the nut opposite the manufactured head, a sleeve forming a bulb that bears against a backside of the sheets and that cooperates with the manufactured head in holding the sheets together, the sleeve having an axial bore and a constant outside diameter for passing through the aligned holes, a threaded core bolt having a head for compressive engagement with an end of the sleeve opposite the nose of the nut and for forcing the sleeve axially toward the manufactured head of the nut upon tightening the core bolt in the nut, the improvement comprising:

(a) the nose of the nut having a diameter throughout its length that is less than the diameter of the shank and defining a radial shoulder where it meets the shank;

(b) a thin-walled section of the sleeve for receipt on the nose of the nut, and a thick-walled section of the sleeve adjacent the thin-walled section and for the compressive engagement with the head of the core bolt, the thin-walled section being internally tapered with the taper converging toward the thick-walled section and away from the manufactured head of the nut, the taper being further defined within plus or minus 10 percent by the following values: the included angle of taper 2°, the ratio of the largest diameter of internal taper to the diameter of the shank 0.918, and the ratio of the length of the tapered section to the diameter of the shank 1.157;

(c) the thin-walled section having an axial length greater than the axial length of the nose of the nut, the thin-walled section being capable of forming a bulb upon being compressed between the shoulder of the nut and the head of the core bolt at the backside of the sheets, the compression being developed by tightening the threads of the core bolt in the threads of the nut, the grip of the fastener being such that the thin-walled section has a small portion of its axial length within the backside sheet before, during and after the formation of the bulb;

(d) the thick-walled section having an inside diameter for concentrically aligning the sleeve and the core bolt, and a thickness to limit bulbing to the thin-walled section and to prevent tuck-out of the sleeve over the head of the core bolt; and (e) a breakneck of the core bolt which fails at the predetermined design clamp-up load, the breakneck separating a tail section of the core bolt from the balance of the core bolt, the tail section having wrenching means for tightening the core bolt in the nut, which means become inoperative upon failure of the breakneck.

10. The improvement claimed in claim 9 wherein the thin-walled section has an axial length and thickness such that the thin-walled section's state of collapse at maximum design axial load on the sleeve has the sides of a fold resulting from the collapse out of contact with one another radially adjacent the nose of the nut and axially adjacent the thick-walled section of the sleeve.

11. An improvement in a blind fastener of the type used in forming a joint with two or more sheets and the fastener, the sheets having a blind side sheet with a backside, the improvement comprising:

(a) a nut, a core bolt, and a sleeve;

(b) the nut having a manufactured head, a shank axially adjacent the manufactured head, a nose axially adjacent the shank, and an axially threaded bore, the manufactured head having a surface for bearing on a setting side of the sheets and means for accepting a wrenching tool, the shank being right cylindrical and having a diameter to substantially fill aligned holes in the sheets, the nose throughout its length having a diameter less than that of the shank and joining the shank at a shoulder, the length of the shank and nose together being greater than the maximum grip of the fastener;

(c) the core bolt having external threads for threaded receipt in the bore of the nut, wrenching means on the core bolt accessible from the setting side of the sheets for cooperation with the wrenching means of the manufactured head of the nut in tightening the core bolt in the nut, and a head of major diameter and for passage through the aligned holes;

(d) the sleeve having an axial bore and a constant external diameter, the sleeve being received by the core bolt between the head thereof and the shoulder of the nut for axial compressive loading between the two;

(e) a thin-walled section of the sleeve for receipt over the shank of the nut and abutting against the shoulder of the nut, the thin-walled section being axially longer than the nose of the nut and being internally tapered with the largest internal diameter of the taper of the thin-walled section being adjacent the shoulder of the nut;

(f) a thick-walled section of the sleeve axially of and adjoining the thin-walled section, the thick-walled section being for bearing against the head of the core bolt; and (g) the thin-walled section being adapted to collapse in hoop failure to form a bulb against the backside of the blind side sheet from an axial compressive force applied to the sleeve through the head of the core bolt and the shoulder of the nut, the compressive force being the result of tightening the core bolt in the nut.

12. The improvement claimed in claim 11 wherein the included angle of the taper is about 2°, the ratio of the largest diameter of the taper to the diameter of the fastener is about 0.928, and the ratio of the length of the tapered section to the diameter of the fastener is about 1.157, with the above three values being within plus or minus ten percent.

13. The improvement claimed in claim 12 wherein the thin-walled section has an axial length and thickness such that the thin-walled section's state of collapse at maximum design axial load on the sleeve has the sides of a fold resulting from the collapse out of contact with one another radially adjacent the nose of the nut and axially adjacent the thick-walled section of the sleeve.

14. The improvement claimed in claim 13 wherein the core bolt includes a breakneck for failure at a predetermined axial load, the breakneck separating a tail section of the core bolt from the balance of the core bolt, the tail section having wrenching means for tightening the core bolt in the nut, which means become inoperative upon failure of the breakneck.

* * * * *

UNITED STATES PATENT AND TRADEMARK OFFICE
CERTIFICATE OF CORRECTION

PATENT NO. : 4,203,346
DATED : May 20, 1980
INVENTOR(S) : David E. Hall et al.

It is certified that error appears in the above—identified patent and that said Letters Patent is hereby corrected as shown below:

In the specification: Column 6, line 24, across from "Length" under the "Part Dimension Divided by Characteristic Diameter" heading, insert --1.707--; Column 6, line 50, across from "Head Diameter" under the "Dimension with Characteristic Diameter(D) of 3/16 inch" heading, above "0.000" insert --0.004--; Column 8, line 56, delete "connot" and insert therefor --cannot--.

Signed and Sealed this

Fourth Day of November 1980

[SEAL]

Attest:

SIDNEY A. DIAMOND

Attesting Officer

Commissioner of Patents and Trademarks